(12) United States Patent
Zehetbauer et al.

(10) Patent No.: US 11,444,531 B2
(45) Date of Patent: Sep. 13, 2022

(54) VOLTAGE CONVERTER

(71) Applicant: KUKA Deutschland GmbH, Augsburg (DE)

(72) Inventors: Sebastian Zehetbauer, Munich (DE); Gerhard Werner, Laupheim (DE); Matthias Zimmermann, Günzburg (DE); Roberto Scibilia, Freising (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 17/267,346

(22) PCT Filed: Jul. 19, 2019

(86) PCT No.: PCT/EP2019/069506
§ 371 (c)(1),
(2) Date: Feb. 9, 2021

(87) PCT Pub. No.: WO2020/030409
PCT Pub. Date: Feb. 13, 2020

(65) Prior Publication Data
US 2021/0265912 A1     Aug. 26, 2021

(30) Foreign Application Priority Data

Aug. 9, 2018 (DE) ...................... 10 2018 213 453.7

(51) Int. Cl.
*H02M 3/156* (2006.01)
*H02M 1/00* (2006.01)
(Continued)

(52) U.S. Cl.
CPC ............. *H02M 3/156* (2013.01); *B25J 9/161* (2013.01); *H02M 1/0074* (2021.05); *H02M 1/0077* (2021.05); *H02M 1/32* (2013.01)

(58) Field of Classification Search
CPC .. H02M 3/156; H02M 3/1582; H02M 3/1584; H02M 3/06; H02M 1/007; H02M 1/0074
See application file for complete search history.

(56) References Cited

U.S. PATENT DOCUMENTS

| 5,932,995 A * | 8/1999 | Wagoner | H02M 3/158 323/222 |
| 2004/0208027 A1* | 10/2004 | Elek | H02M 1/34 363/71 |

(Continued)

FOREIGN PATENT DOCUMENTS

| DE | 3832446 A1 | 4/1989 |
| EP | 3101794 A2 | 12/2016 |

OTHER PUBLICATIONS

Ting Qian et al, "Input-Series Two-Stage DC-DC Converter with Inductor Coupling", Power Electronics Specialists Conference, 2007. PESC 2007. IEEE, IEEE, Piscataway, NJ, USA, (Jun. 17, 2007), ISBN 978-1-4244-0654-8, pp. 326-330, XP031218310 [I] 1-11; p. 324, col. Ih, line 3; figure 2; p. 327, col. rh, lines 1-20.

(Continued)

*Primary Examiner* — Nguyen Tran
(74) *Attorney, Agent, or Firm* — Dorton & Willis, LLP

(57) ABSTRACT

A voltage converter, which is configured as a step-down converter for reducing an input direct voltage to an output direct voltage lower than the input direct voltage, includes a first step-down converter circuit arrangement, having a first semiconductor switching element with a first control input, a first coupled choke having a first freewheeling diode, and a first input capacitor and a first output capacitor. A second step-down converter circuit arrangement, includes a second semiconductor switching element having a second control input, a second coupled choke having a second freewheeling diode, and a second input capacitor and a second output (Continued)

capacitor. An associated control device controls the voltage converter.

11 Claims, 2 Drawing Sheets

(51) Int. Cl.
*B25J 9/16* (2006.01)
*H02M 1/32* (2007.01)

(56) References Cited

U.S. PATENT DOCUMENTS

| | | | |
|---|---|---|---|
| 2007/0075689 A1* | 4/2007 | Kinder | H02M 3/1582 |
| | | | 323/259 |
| 2011/0019431 A1 | 1/2011 | Wegner et al. | |
| 2012/0187932 A1* | 7/2012 | Singnurkar | H02M 3/158 |
| | | | 323/282 |
| 2016/0359427 A1 | 12/2016 | Ghosh et al. | |

OTHER PUBLICATIONS

European Patent Office; Search Report in related International Patent Application No. PCT/EP2019/069506 dated Sep. 18, 2019; 6 pages.
European Patent Office; Written Opinion in related International Patent Application No. PCT/EP2019/069506 dated Sep. 18, 2019; 9 pages.
German Patent Office; Search Report in related German Patent Application No. 10 2018 213 453.7 dated Apr. 29, 2019; 8 pages.

* cited by examiner

VOLTAGE CONVERTER

CROSS-REFERENCE TO RELATED APPLICATIONS

This application is a national phase application under 35 U.S.C. § 371 of International Patent Application No. PCT/EP2019/069506, filed Jul. 19, 2019 (pending), which claims the benefit of priority to German Patent Application No. DE 10 2018 213 453.7, filed Aug. 9, 2018, the disclosures of which are incorporated by reference herein in their entirety.

TECHNICAL FIELD

The invention relates to a voltage converter, which is configured as a step-down converter, for reducing an input direct voltage into an output direct voltage lower than the input direct voltage. The invention further relates to an associated control device for controlling a voltage converter of this type.

BACKGROUND

From US 2011/0194317 A1 a voltage converter is known which contains a transformer having two primary coils and one secondary coil. The converter has an input direct current and, in parallel therewith, a capacitor bank, comprising two capacitors. A switch is assigned to each primary coil. A gate driver feedback module outputs a pulse width modulated signal to control either the first or second primary coil. A gate control switch controls the first and second switches with the aid of the pulse-width-modulated signal. A logic control module detects which of the two capacitors has a higher voltage and controls the switch of an associated primary coil with the aid of the pulse-width-modulated signal. The aforementioned voltage converter is a flyback converter and has the advantages and disadvantages typical of flyback converters, e.g. galvanic isolation between the input side and output side, as well as a limitation of the power that can usually be sensibly converted to a maximum of approx. 250 W.

SUMMARY

The object of the invention is to create a voltage converter configured as a step-down converter which, despite the cost-effective circuit structure, has a high level of efficiency.

The object is achieved according to the invention by a voltage converter, which is designed as a step-down converter, for reducing an input direct voltage to a lower output direct voltage than the input direct voltage, comprising
- a first step-down converter circuit arrangement, comprising a first semiconductor switching element having a first control input, a first coupled choke having a first freewheeling diode, and a first input capacitor and a first output capacitor,
- a second step-down converter circuit arrangement comprising a second semiconductor switching element having a second control input, a second coupled choke having a second freewheeling diode, and a second input capacitor and a second output capacitor, wherein the first input capacitor of the first step-down converter circuit arrangement and the second input capacitor of the second step-down converter circuit arrangement are arranged in series in order to share the input voltage, wherein the first semiconductor switching element and first freewheeling diode, as well as the second semiconductor switching element and the second freewheeling diode are arranged in series, and the first freewheeling diode and the second freewheeling diode are designed in an open state of the respective associated semiconductor element to protect the circuit from an overvoltage of the first coupled choke and the second coupled choke, and/or to enable current flow of the first coupled choke and the second coupled choke during the reduction of the magnetic flux of the first coupled choke and the second coupled choke, wherein the first coupled choke and the second coupled choke are coupled to one another in a transformer, wherein the first output capacitor and the second output capacitor are arranged in series and form a voltage divider, and the first step-down converter circuit arrangement and the second step-down converter circuit arrangement have a common feedback voltage divider which has a first resistor and a second resistor.

A voltage converter is generally designed to convert an input voltage of a certain potential into an output voltage having a potential different from the input voltage. For example, the voltage converter can be a DC voltage converter which has at least one energy-transferring component, such as a capacitor, an inductor or a capacitor and at least one inductor. The DC voltage converter can in particular be a step-down converter which has at least one inductor. The step-down converter or buck converter converts a higher input voltage to a lower output voltage.

The input direct voltage can be a voltage which is taken, for example, from a rectified three-phase network or a rectified single-phase network or an intermediate circuit or a DC power supply.

The output direct voltage can be a voltage that has changed in potential and/or over time to an input voltage. The output direct voltage can in particular have a lower potential than the input direct voltage.

The step-down converter circuit is based on a step-down converter known per se. According to the invention, however, the voltage converter has two separate step-down converter circuit arrangements which are connected in terms of circuitry.

The semiconductor switching element can be designed as a transistor, which can be, for example, a bipolar transistor or a field effect transistor or a bipolar transistor having an insulated gate electrode (IGBT). In particular, the transistor can be a MOSFET (metal-oxide-semiconductor field effect transistor), which can be made of silicon.

In the inventive circuit, it is provided that the first and second coupled chokes are coupled to one another in a transformer. The transformer coupling can be used in such a way that the voltages at the two coupled chokes are balanced. The balancing enables a voltage which has the same potential to be induced at the first coupled choke and at the second coupled choke, respectively. In addition, the transformer coupling can balance the time profile of the voltage changes when magnetizing and/or demagnetizing the first coupled choke and the second coupled choke.

The input direct voltage is largely evenly divided between the first and second input capacitor, which is connected as a voltage divider in series to the input direct voltage. The switch-on time and switch-off time of the voltage converter is regulated in such a way that a predefined output direct voltage is generated. For this purpose, the output direct voltage is fed from the input direct voltage during the switch-on period and from the decreasing magnetic fields of the four chokes during the switch-off period.

With an even distribution, one half of the input direct voltage is applied to the first step-down converter circuit arrangement and the other half to the second step-down converter circuit arrangement during the switch-on period of the first and second semiconductor switching elements. While the voltage converter is switched on, the chokes each build up a magnetic field and the output voltages of the first and second step-down converter circuit arrangements are applied to the first output capacitor and to the second output capacitor and each define half the output direct voltage to be dissipated. Due to the transformer coupling of a coupled choke of the first and second step-down converter circuit arrangement, it can be ensured, despite tolerances, that at least approximately the same output voltage is present in the first step-down converter circuit arrangement and the second step-down converter circuit arrangement, respectively. The output voltages of the first and second step-down converter circuit arrangement add up via the series connection of the first and second output capacitor and can be output to a subsequent circuit.

During the switch-off period of the semiconductor switching elements, the current flow is maintained by the decreasing magnetic field in the chokes, which is made possible by the first and second freewheeling diodes, respectively. In this operating state, the input direct voltage is not involved in generating the output direct voltage.

In summary, the function can also be described as follows: a synchronous mode of operation of the series-connected first and second semiconductor switching elements, as well as of the series-connected first and second input capacitors and of the series-connected first and second output capacitor, succeeds when the step-down converter circuit arrangement is redundant and is connected in series, wherein the first and the second step-down converter circuit arrangements in series are advantageously constructed in a mirrored manner.

Ideally, the input direct voltage is divided equally between the first and second input capacitors and the other electronic components of the voltage converter. In the case of real components having parasitic effects, this will not be completely the case, since, for example, tolerances of the first coupled choke and/or the second coupled choke and/or different switching times of the first and second semiconductor switching elements prevent completely synchronous behavior.

One of the proposed measures is therefore to choose an arrangement in which the required inductor for each buck converter is implemented with two coupled chokes, wherein the two coupled chokes of the two buck converters are coupled in a transformer via a common magnetic core.

To understand voltage balancing, the demagnetization process can first be considered. During demagnetization, the first and second freewheeling diodes are conductive and the first and second semiconductor switches are operated non-conductively. The circuit is thus in the switched-off state. In addition, the two non-coupled chokes are not considered for understanding the ideal circuit.

Due to the transformer coupling of the first buck converter and the second buck converter, the voltages of the respective coupled chokes are equal. Due to the physical relationship of Kirchhoff's Second Law, the rule of meshes, the voltage of the coupled choke of the first buck converter is also applied to the first output capacitor via the first freewheeling diode, wherein the voltage drop at the first freewheeling diode is approximately zero. The voltage at the first output capacitor thus corresponds at least approximately to the voltage of the coupled choke of the first buck converter.

The voltage of the coupled choke of the second buck converter is applied to the second output capacitor via the second freewheeling diode, wherein a voltage drop across the second freewheeling diode is approximately zero. The voltage at the second output capacitor thus corresponds approximately to the voltage of the coupled choke of the second buck converter.

According to one aspect of the invention, the voltages of the first and second output capacitors are accordingly at least approximately balanced via the transformer coupling of the first and second coupled chokes. The sum of the voltages at the first and second output capacitors results in the output direct voltage of the voltage converter.

During the magnetization, the first and second freewheeling diodes are non-conductive and the first and second semiconductor switches are operated conductively. The circuit is thus in the switched-on state.

The voltage across the first input capacitor is approximately equal to the voltage of the first coupled choke and the first output capacitor because of the mesh rule in the circuit of the first input capacitor, the first semiconductor switching element, the first coupled choke and the first output capacitor. The voltage across the second input capacitor is approximately equal to the voltage of the second coupled choke and the second output capacitor because of the mesh rule in the circuit of the second input capacitor, the second semiconductor switching element, the second coupled choke and the second output capacitor. Thus, because of the approximate balancing of the voltages across the first output capacitor and the second output capacitor and because of the transformer effect at the two coupled first and second chokes, the voltage across the input capacitors is approximately evenly divided and their sum is, due to the mesh rule, the total input voltage across the first input capacitor and the second input capacitor.

The output voltage can be measured from the first resistor and the second resistor having a voltage divider and fed to a control circuit. The current can be measured with a shunt resistor and optionally also fed to the control device. Other methods of current measurement are possible, e.g. the use of a current transformer. On the basis of the measured output voltage and on the basis of the current, the control device sets the switch-on and switch-off times of the first and second semiconductor switching elements.

The inventive voltage converter in all its disclosed embodiment variants can in particular be part of a robot, i.e. part of a control device of a robot, such as a robot controller, which is designed and configured to control a first semiconductor switching element of the voltage converter at a first control input and a second semiconductor switching element of the voltage converter at a second control input. The voltage converter in connection with a robot can be used to control the electrical drives of the joints of the robot, i.e. its robot arm.

The voltage converter can have a first non-coupled choke and a second non-coupled choke, which are arranged in series with the first and the second coupled choke.

In addition to storing energy in their magnetic field, the non-coupled chokes can be used, in particular, to suppress the currents of the voltage converter. The suppression can compensate for differences in the switching cycles of the semiconductor switching elements.

The function of the circuit can also be described as follows, on the assumption that the times at which the first and second semiconductor switches are switched on or off will not be exactly simultaneous in a real circuit, and therefore an ideal operating mode is not ensured. The deviation can be compensated for by inserting a first and second non-coupled choke, which are each arranged in series with the first and second coupled chokes. With the help of the first and second non-coupled chokes, a quantifiable compromise can be found which, on the one hand, compensates for a time offset in the switching times and, on the other hand, enables an easily manageable difference between the voltages to be synchronized in the first and second step-down converter circuit arrangements. If the leakage inductance of the coupled chokes is large enough and is known and quantifiable, the non-coupled chokes may be omitted.

The choke can be designed as an inductor, which can in particular be designed as a coil.

The voltage converter can have a measuring resistor which is arranged in series with at least one of the chokes or one of the freewheeling diodes or one of the semiconductor switching elements, wherein the measuring resistor has a first connection which is designed to tap a first measuring voltage and a second connection which ideally is connected both to the non-coupled choke and to the ground of the control voltage, which is provided in particular on the secondary side. Depending on the position of the measuring resistor, a different position of the control voltage ground can also be useful.

Although the measuring resistor can be arranged at different points, an unusual but advantageous position results at the said point with the ground on the secondary side.

In a particular implementation, however, due to the circuit on the output side, it can be the case that the resistor is arranged in series with a semiconductor switching element. Accordingly, the control voltage ground has also shifted downwards.

The measuring resistor can be designed as an ohmic resistor, which can be used as a measuring transducer for converting an electrical current into an electrical voltage. For this purpose, it should preferably have a high level of accuracy, be independent of thermal effects, and not generate any thermal voltage.

The measuring resistor is used, for example, to generate a measuring voltage, in particular by a control device for determining the output current. The control device can set the switch-on and switch-off time of the first and second semiconductor switching elements on the basis of the measured current.

The measuring resistor can be designed as a metal film resistor or a carbon film resistor which has a predetermined resistance value.

The voltage converter can have at least one tap for measurement signals such that the at least one tap is designed to provide at least one measurement signal, in particular at least one measurement voltage.

In this embodiment variant, the tap can be designed to create a measuring point for electronic signals within the circuit. Measurement points can preferably be provided in a circuit for tapping output signals or control signals.

The tapped signals can be used, for example, to control the voltage converter or serve as a control signal for preceding or subsequent circuits.

The tap can be designed as an electrical connection for a control device, for example the tap can be designed as a pin, as a terminal or as a soldering nail or soldering eye.

The measurement signal can be a physical variable which is converted into an electrical signal. In particular, the measurement signal can be a measurement voltage.

The common core of the coupled chokes can have at least one auxiliary winding having at least one tap for at least one measurement signal.

The first coupled choke and the second coupled choke can have a common magnetic core which has at least one auxiliary winding having at least one tap for at least one measurement signal and/or for the control voltage supply. The auxiliary winding can be designed as a winding of the common magnetic core of the first coupled choke and the second coupled choke, so that a measurement signal can be tapped. In particular, due to the magnetic changes in the inductors, the measurement signal can induce an electrical charge which can then be tapped as a measurement signal.

For example, an applied auxiliary winding can be used to measure a measurement voltage at the magnetic core of the coupled chokes, which measurement voltage can be evaluated by a control device.

The function can also be described by way of example that an additional winding is applied to the magnetic core of the first and second chokes coupled in a transformer in order to reduce the switching losses. The function of this additional auxiliary winding is that energy for the control circuit of the converter can be obtained therefrom and an image of the voltage curves in the power branch, which corresponds to the winding of the first and the second coupled chokes, can also be determined. The energy obtained can be used to switch the semiconductor switching elements with low loss while the voltage in the power branch drops. For this purpose, the voltage converter is not operated with a fixed clock frequency and a variable pulse-pause ratio, but rather in the transition between continuous operation and intermittent operation, which is referred to as the freely oscillating operating mode.

The auxiliary winding can be designed as a wire winding, in particular the auxiliary winding can be designed as a wire winding on the magnetic core of the chokes coupled in a transformer.

The voltage converter can be designed to reduce input direct voltages, in particular to reduce a rectified input direct voltage from a single-phase network, three-phase network and/or an input direct voltage from an intermediate circuit.

The rectified single-phase network voltage, three-phase network voltage and/or the intermediate circuit voltage can be used as the input direct voltage of a circuit which, in particular, can process input direct voltages.

With the aid of the rectified single-phase network voltage, three-phase network voltage and/or the intermediate circuit voltage, it is possible, for example, to generate an output direct voltage whose potential is changed compared to the input direct voltage. In particular, output direct voltages can be generated which have a lower potential than the input direct voltage.

The rectified three-phase network voltage can, for example, be a voltage from a three-phase network that has been rectified. The rectified single-phase network voltage can be, for example, a voltage from a single-phase network that has been rectified.

The intermediate circuit voltage can be a voltage that has been recovered, for example, from inductive effects, or it can be a single-phase or three-phase voltage that has been rectified, or it can be a DC voltage.

The semiconductor switching elements can be designed to switch as a function of control signals which are supplied via a respective control input of the respective semiconductor switching element.

The semiconductor switching elements can be opened or closed in a controlled manner by an input current or an input voltage at a control input and also be partially opened or partially closed.

In particular, the semiconductor switching elements can be used to control the voltage change of the voltage converter, so that a current flow of an input voltage to the first and/or the second coupled choke is enabled or prevented or is possible in parts.

The voltage converter can have a ground tap, which is contacted on the secondary side of the voltage converter, in particular between the measuring resistor and the first or second non-coupled choke, and the reference potential for the control voltage supply and/or the measurement signal and/or at least one control voltage and/or at least provides a measuring voltage.

The ground tap can provide a reference potential for subsequent circuits or control devices, through which a defined zero potential is specified.

The invention also relates to a control device which is configured to control a voltage converter, as described. The control device can be designed and configured to control, i.e. in particular to switch, the first semiconductor switching element of the voltage converter at the first control input and the second semiconductor switching element of the voltage converter at the second control input.

The control device can be designed and configured to control semiconductor switching elements so that the first semiconductor switching element and/or the second semiconductor switching element are controlled with a control voltage and/or a control current. The controller can have a control logic adapted to requirements for controlling the first and/or the second semiconductor switching element.

The control device can, for example, generate an output voltage having a defined potential in such a way that the control device controls the first and the second semiconductor switching elements having variable switch-on and/or switch-off times.

The control device can, for example, be a microcontroller or a control computer or an integrated circuit which is designed and configured to control the semiconductor switching elements.

The control device can be designed and configured to record at least one measurement signal, in particular to record a first measurement voltage, a second measurement voltage and/or at least one first measurement signal of at least one auxiliary winding of the voltage converter.

The measurement signal can include electrical variables or physical variables which are converted into electrical quantities.

For example, measurement signals can be used to verify the function of the voltage converter, in particular the measurement signals can contain electrical variables such as the output voltage or output current of the respective circuit or electrical measurands that are used to control the voltage converter.

The control device can be configured to control the first semiconductor switching element of the voltage converter and the second semiconductor switching element of the voltage converter with respect to a variable switch-on time and/or a variable switch-off time, so that the switching frequency of the voltage converter is limited by a minimum switch-on time and/or a minimum switch-off time.

For example, the output voltage of the voltage converter can be controlled and changed by the duty cycle.

The control device can be configured to control the voltage converter in a freely oscillating operating mode, which lies in a transition range between intermittent operation and continuous operation.

The function can be described as follows, for example, that the switching frequency, which would be set based on the freely oscillating behavior depending on the input voltage and load and which would increase with decreasing output load, should be limited. This is so because a disadvantage of an increasing switching frequency would be that the switching losses would increase roughly proportionally to the switching frequency. In partial load operation or in idle operation, due to the limited maximum switching frequency, there is a transition from operation in the freely oscillating state to intermittent operation. The maximum switching frequency can be freely selected when designing the circuit and represents a compromise between the best possible dynamic control behavior and operation with the lowest possible partial load or no-load losses. One possibility for limiting the switching frequency is, for example, specifying a minimum on-time or off-time. This option can be used in conjunction with the existing voltage converter.

The control device can be designed and configured to measure or process the profile or the instantaneous value of the first measurement voltage, the profile or the instantaneous value of the second measurement voltage and the profile or the instantaneous value of the at least first measurement signal of the at least one auxiliary winding of the voltage converter, to use the measurements of the profiles or instantaneous values of the first measurement voltage, the second measurement voltage and the at least first measurement signal of the at least one auxiliary winding of the voltage converter for the switching control of the first semiconductor switching element and the second semiconductor switching element, in particular through pulse width modulation and/or frequency modulation.

For example, individual values can be added up or calculations or conversions can be carried out before the result is compared with the threshold value.

In this respect, the control device can also be designed and configured to measure the profile of the first measurement voltage, the profile of the second measurement voltage, and the profile of the first measurement signal of the at least one auxiliary winding, and to compare the profile of the first measurement voltage, the second measurement voltage and the first measurement signal having at least one set threshold value, and to switch the first semiconductor switching element and the second semiconductor switching element when the respective threshold value is reached.

The threshold value can be a calculated value of the control device and is used for comparison with measured and/or processed values of the voltage converter.

In particular, the threshold value can be used to use logic programming and/or to compare conditions.

The threshold value can have a value which through comparison with a measured value, for example exceeding or falling below a threshold value, determined by comparison with a measured value, can lead to at least one of the semiconductor switching elements being controlled.

The function can be described as follows: the voltage converter is not operated with a fixed clock frequency and a variable pulse-pause ratio, but rather in the transition between continuous operation and intermittent operation, which is referred to as the freely oscillating operating mode. In this operating mode, the voltage converter is a freely oscillating step-down converter. Operation in the transition between continuous operation and intermittent operation can also be advantageous compared to operation with a fixed clock frequency, since there is a wait before the start of each new magnetization phase until the energy in the four chokes has been completely reduced. This leads to resonance oscillations, which can be used to reduce the switching losses in that the semiconductor switching elements can be switched on at an optimal point in time by means of measurements of at least one auxiliary winding. Due to the freely oscillating operation, the voltage converter is always reset to its initial state and avoids a number of difficulties resulting from synchronous use.

A specific embodiment of the invention is explained in more detail in the following description with reference to the accompanying figures. Specific features of this embodiment can represent general features of the invention regardless of the specific context in which they are mentioned, possibly also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
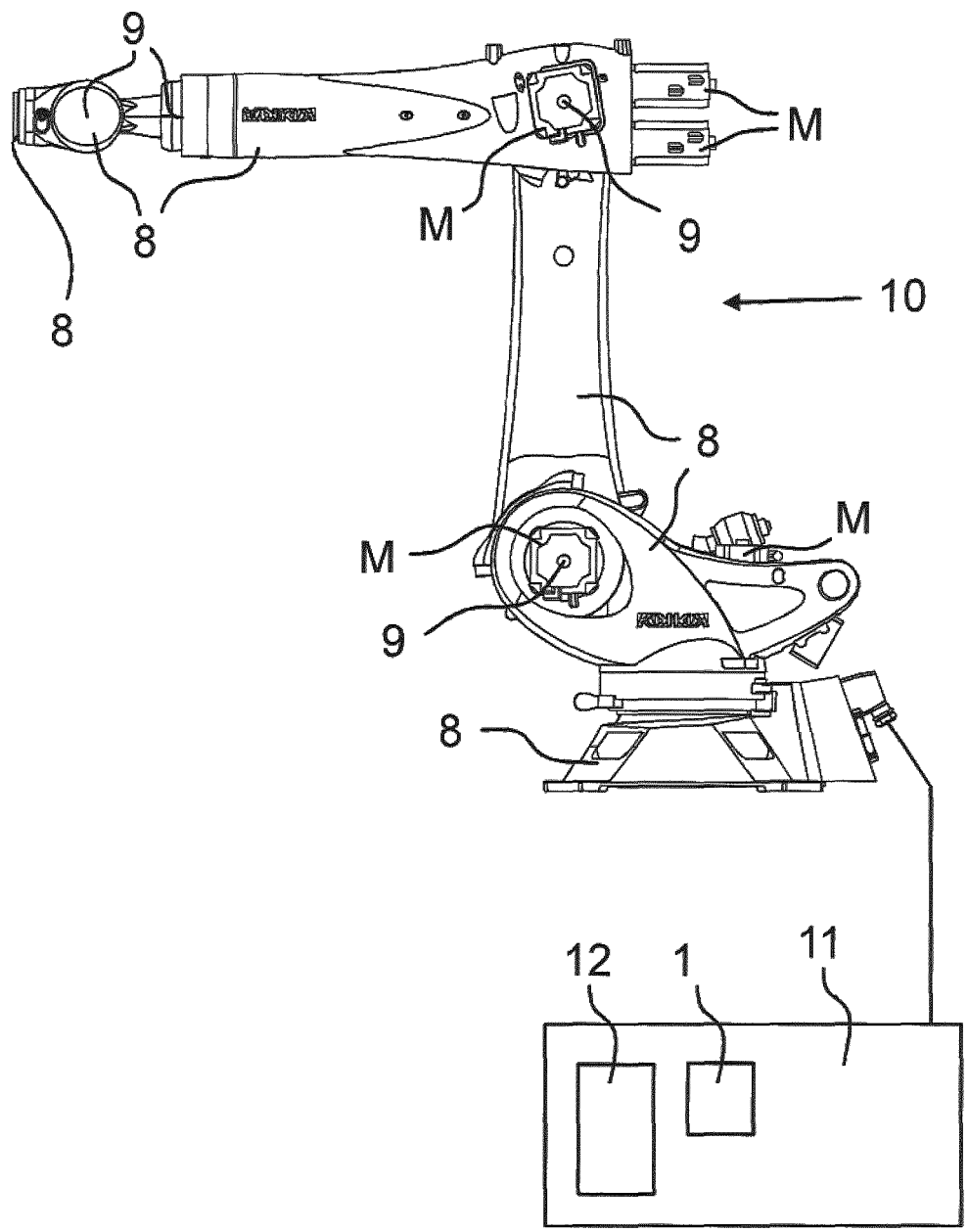
FIG. 1 is a side view of an exemplary robot having a robot controller that includes an inventive voltage converter.

In the case of the embodiment in FIG. 1, the robot 10 has a plurality of links 8 and joints 9 which adjust the links 8 relative to one another. Each joint 9 is driven by a motor M of the robot arm 10. A robot controller 11 is provided to control the motors M in order to move the links 8 of the robot arm 1 by automatically adjusting the joints 9. In the case of the present embodiment, all joints 9 of the robot arm 10 are designed as rotating joints. Each rotating joint can be rotated about an axis of rotation.

In the case of the present embodiment, the robot controller 11 comprises a control device 12 that is designed and configured to control a first semiconductor switching element $Q_h$ of the voltage converter 1 at a first control input $U_{gh}$ and a second semiconductor switching element $Q_l$ of the voltage converter 1 at the second control input $U_{gl}$.

Figure 2:
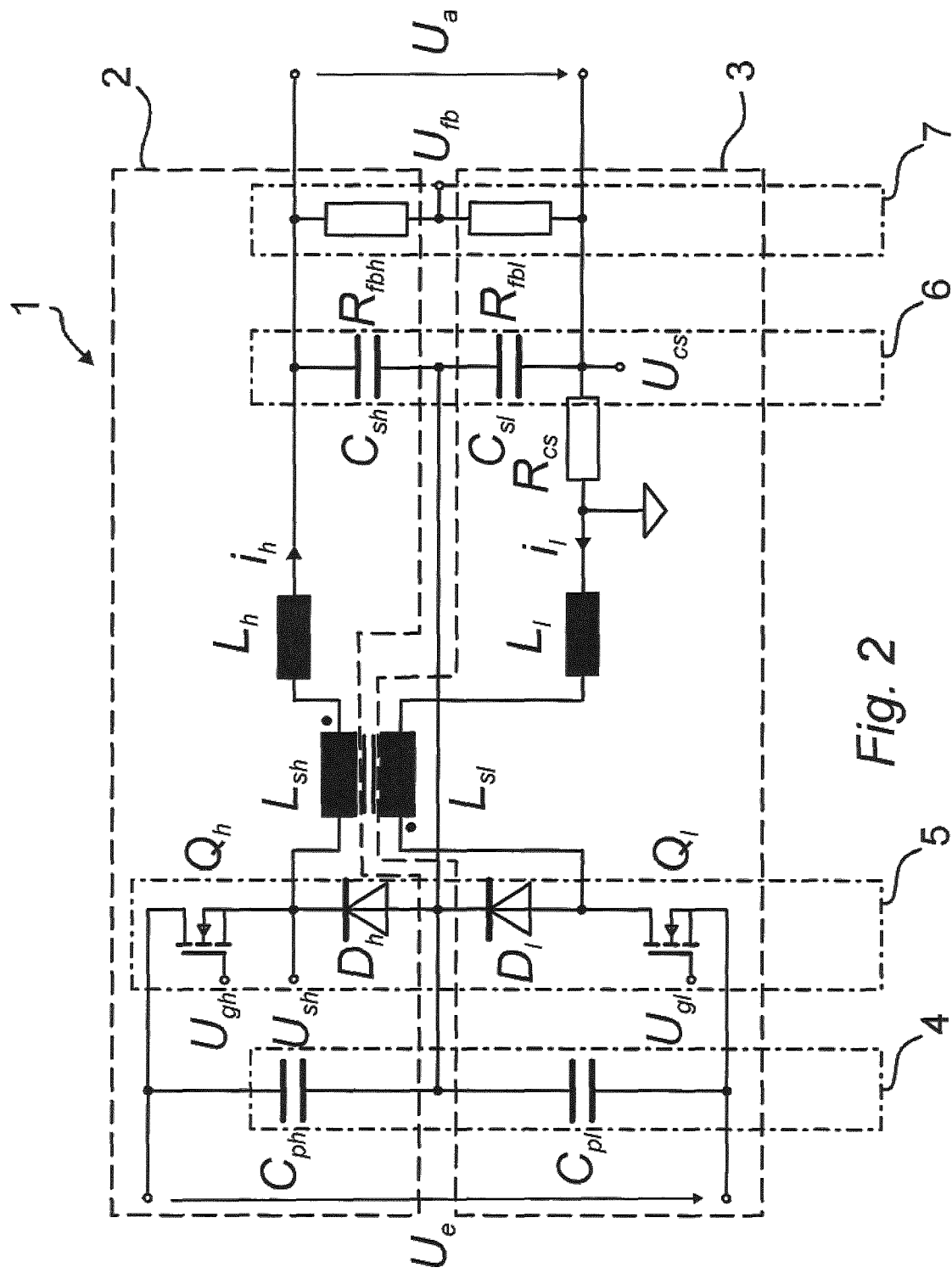
FIG. 2 is a circuit diagram of the inventive voltage converter.

In FIG. 2, the voltage converter 1 is shown on its own in the form of a circuit diagram which is designed as a step-down converter for reducing an input direct voltage $U_e$ into an output direct voltage $U_a$ that is lower than the input direct voltage $U_e$.

The voltage converter 1 comprises a first step-down converter circuit arrangement 2 which has a first semiconductor switching element $Q_h$ having a first control input $U_{gh}$, a first coupled choke $L_{sh}$ having a first freewheeling diode $D_h$, a first resistor $R_{bfh}$ and a first input capacitor $C_{ph}$ and a first output capacitor $C_{sh}$.

The voltage converter 1 also includes a second step-down converter circuit arrangement 3, which has a second semiconductor switching element $Q_l$ having a second control input $U_{gl}$, a second coupled choke $L_{sl}$ having a second freewheeling diode $D_l$, a second resistor $R_{fbl}$ and a second input capacitor $C_{pl}$ and a second output capacitor $C_{sl}$.

The first step-down converter circuit arrangement 2 and the second step-down converter circuit arrangement 3 are electronically interconnected with the aid of a first series connection of the first input capacitor $C_{ph}$ and the second input capacitor $C_{pl}$, which form a first voltage divider 4. The first semiconductor switching element $Q_h$ is connected in series with the first freewheeling diode $D_h$ and the second semiconductor switching element $Q_l$ is connected in series with the second freewheeling diode $D_l$. The first coupled choke $L_{sh}$ has, on the one hand, a connection between the first semiconductor switching element $Q_h$ and the first freewheeling diode $D_h$ and, on the other hand, a second connection to an output capacitor $C_{sh}$. The second coupled choke $L_{sl}$ has on the one hand a connection between the second semiconductor switching element $Q_l$ and the second freewheeling diode $D_l$ and on the other hand a second connection to an output capacitor $C_{sl}$. The first output capacitor $C_{sh}$ is connected in series with the second output capacitor $C_{sl}$ to form a third voltage divider 6 and is parallel to a feedback voltage divider 7, which is formed by a first resistor $R_{fbh}$ and a second resistor $R_{fbl}$.

The voltage converter 1 also has a circuit connection between the first voltage divider 4, the second voltage divider 5, and the third voltage divider 6. In the case of the first voltage divider 4, the connection is arranged between the first input capacitor $C_{ph}$ and the second input capacitor $C_{pl}$. The second voltage divider 5 has a connection between the first freewheeling diode $D_h$ and the second freewheeling diode $D_l$. In the case of the third voltage divider 6, a connection is arranged between the first output capacitor $C_{sh}$ and the second output capacitor $C_{sl}$.

The first freewheeling diode $D_h$ enables a current to flow when the first semiconductor switching element $Q_h$ of the first step-down converter circuit arrangement 2 is switched off, and the second freewheeling diode $D_l$ enables a current to flow when the second semiconductor switching element $Q_l$ of the second step-down converter circuit arrangement 3 is switched off.

The first coupled choke $L_{sh}$ and the second coupled choke $L_{sl}$ have a transformer coupling, which substantially takes place via a magnetic core and ensures that the voltages of the first step-down converter circuit arrangement 2 and the second step-down converter circuit arrangement 3 are approximately balanced.

In the case of the present embodiment, the voltage converter 1 additionally has a first non-coupled choke $L_h$ and a second non-coupled choke $L_l$, which are arranged in series with the first coupled choke $L_{sh}$ and the second coupled choke $L_{sl}$. The first non-coupled choke $L_h$ and the second non-coupled choke $L_l$ make it possible to compensate for variances when switching the first semiconductor switching element $Q_h$ and the second semiconductor switching element $Q_l$.

Furthermore, the voltage converter 1 optionally has a measuring resistor $R_{cs}$, which is arranged in series between the second non-coupled choke $L_l$ and the second output capacitor $C_{sl}$.

The embodiment has, for example, three taps for tapping measurement signals. The first tap $U_{sh}$ is located between the first semiconductor switching element $Q_h$ and the freewheeling diode $D_h$. In the specific case, however, the first tap $U_{sh}$ is not used for measurement, but only for the voltage supply of the first semiconductor switching element $Q_h$ via the first control input $U_{gh}$. In other design variants, however, the controller can also use the first tap $U_{sh}$ as a measurement signal. The second tap $U_{cs}$ is located between the second output capacitor $C_{sl}$ and the measuring resistor $R_{cs}$. The third tap $U_{fb}$ is located between the resistors $R_{fbh}$ and $R_{fbl}$ forming the first and second output voltage divider.

Signals or voltages can be tapped via the first tap $U_{sh}$ and the second tap $U_{cs}$ and the third tap $U_{fb}$, which can be fed to the control device 12 (FIG. 1) for evaluation and/or for controlling the voltage converter 1.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A voltage converter, configured as a step-down converter, for reducing an input direct voltage into an output direct voltage that is lower than the input direct voltage, the voltage converter comprising:
   a first step-down converter circuit arrangement, comprising:
      a first semiconductor switching element having a first control input,
      a first coupled choke having a first freewheeling diode, and a first input capacitor, and
      a first output capacitor; and
   a second step-down converter circuit arrangement, comprising:
      a second semiconductor switching element having a second control input,
      a second coupled choke having a second freewheeling diode, and
      a second input capacitor and a second output capacitor;
   wherein the first input capacitor of the first step-down converter circuit arrangement and the second input capacitor of the second step-down converter circuit arrangement are arranged in series in order to share the input voltage;
   wherein the first semiconductor switching element and the first freewheeling diode, as well as the second semiconductor switching element and the second freewheeling diode, are arranged in series, and the first freewheeling diode and the second freewheeling diode are configured to at least one of:
      protect the respective circuit from at least one of an overvoltage of the first coupled choke and the second coupled choke, or a current flow when the respectively assigned semiconductor switching element is open, or
      enable the flow of current of the first coupled choke and the second coupled choke during a reduction of a magnetic flux of the first coupled choke and the second coupled choke;
   wherein the first coupled choke and the second coupled choke are coupled to one another in a transformer;
   wherein the first output capacitor and the second output capacitor are arranged in series and form a voltage divider;
   wherein the first step-down converter circuit arrangement and the second step-down converter circuit arrangement have a common feedback voltage divider which has a first resistor and a second resistor;
   wherein the first coupled choke and the second coupled choke have a common magnetic core, the magnetic core having at least one auxiliary winding having at least one tap for at least one of:
      at least one measurement signal, or
      the control voltage supply; and
   wherein the voltage converter is operated in a freely oscillating operating mode, which lies in a transition range between an intermittent operation and a continuous operation, such that there is a wait before a start of each new magnetization phase until an energy in the chokes has been completely reduced.

2. The voltage converter of claim 1, further comprising:
   a first non-coupled choke and a second non-coupled choke which are arranged in series with the first and the second coupled chokes.

3. The voltage converter of claim 2, further comprising:
   a measuring resistor arranged in series with at least one of the first or second non-coupled chokes or one of the freewheeling diodes or one of the semiconductor switching elements;
   the measuring resistor having a first connection configured to tap a first measurement voltage, and having a second connection connected to at least one of the first non-coupled choke or the second non-coupled choke, and connected to a ground of a control voltage.

4. The voltage converter of claim 3, wherein at least one of:
   the second connection of the measuring resistor is connected to the first and second non-coupled chokes; or
   the ground of the control voltage is provided on a secondary side of the voltage converter.

5. The voltage converter of claim 1, wherein the voltage converter is configured for reducing at least one of:
   a rectified input direct voltage from a single-phase network;
   a rectified input direct voltage from a three-phase network; or
   an input direct voltage from an intermediate circuit.

6. A control device for a voltage converter, wherein:
   the control device is configured to control the voltage converter according to claim 1 by:
   controlling the first semiconductor switching element of the voltage converter at the first control input; and
   controlling the second semiconductor switching element of the voltage converter at the second control input.

7. The control device of claim 6, wherein the control device is configured to receive at least one of:
   at least one measurement signal, in particular a first measurement voltage;
   a second measurement voltage; or
   at least a first measurement signal of at least one auxiliary winding of the voltage converter.

8. The control device of claim 6, wherein the control device is configured to control the first semiconductor switching element and the second semiconductor switching element with respect to at least one of a variable switch-on time or a variable switch-off time, such that a switching frequency of the voltage converter is limited by at least one of a minimum switch-on time or a minimum switch-off time.

9. The control device of claim 7, further configured to:
   measure or process the profile or the instantaneous value of the first measurement voltage, the profile or the instantaneous value of the second measuring voltage, and the profile or the instantaneous value of the at least first measurement signal of the at least one auxiliary winding of the voltage converter; and
   use the measurements of the profiles or instantaneous values of the first and second measurement voltages, and the at least first measurement signal of the at least one auxiliary winding for the switching control of the first semiconductor switching element and the second semiconductor switching element.

10. The control device of claim 9, wherein the control device controls switching of the first and second semiconductor switching elements by at least one of pulse width modulation or frequency modulation.

11. The control device of claim 7, further configured to:
measure the profile of the first measuring voltage, the profile of the second measuring voltage, and the profile of the first measuring signal of the at least one auxiliary winding;
compare the measurements of the profiles of the first measurement voltage, the second measurement voltage, and the first measurement signal with respect to at least one set threshold value; and
switch the first semiconductor switching element and the second semiconductor switching element when the respective threshold value is reached.

* * * * *